United States Patent
Park et al.

(10) Patent No.: US 9,362,054 B2
(45) Date of Patent: Jun. 7, 2016

(54) MULTILAYER CERAMIC CAPACITOR

(71) Applicant: SAMSUNG ELECTRO-MECHANICS CO., LTD., Suwon, Gyunggi-do (KR)

(72) Inventors: Heung Kil Park, Gyunggi-do (KR); Min Cheol Park, Gyunggi-do (KR)

(73) Assignee: SAMSUNG ELECTRO-MECHANICS CO., LTD., Suwon, Gyunggi-Do (KR)

( * ) Notice: Subject to any disclaimer, the term of this patent is extended or adjusted under 35 U.S.C. 154(b) by 72 days.

(21) Appl. No.: 14/066,328

(22) Filed: Oct. 29, 2013

(65) Prior Publication Data

US 2015/0016013 A1    Jan. 15, 2015

(30) Foreign Application Priority Data

Jul. 11, 2013  (KR) .................. 10-2013-0081761

(51) Int. Cl.
*H01G 4/008* (2006.01)
*H01G 2/06* (2006.01)
*H01G 4/33* (2006.01)
*H01G 4/30* (2006.01)
*H01G 4/232* (2006.01)

(52) U.S. Cl.
CPC . *H01G 4/30* (2013.01); *H01G 4/232* (2013.01)

(58) Field of Classification Search
CPC ......... H01G 4/008; H01G 2/065; H01G 4/33; H01G 4/30; H05K 2201/10015
See application file for complete search history.

(56) References Cited

U.S. PATENT DOCUMENTS 6,331,930 B1 * 12/2001 Kuroda et al. ............. 361/306.3
6,473,292 B1 * 10/2002 Yoshida et al. ............. 361/321.2
7,567,425 B1 * 7/2009 Lee et al. .................... 361/306.3
7,905,012 B2 * 3/2011 Kuwajima et al. .............. 29/847
7,920,370 B2 * 4/2011 Lee et al. .................... 361/306.3
8,081,416 B2 * 12/2011 Lee et al. ....................... 361/303
8,194,389 B2 * 6/2012 Lee et al. ....................... 361/303

(Continued)

FOREIGN PATENT DOCUMENTS

JP   03183110 A  *  8/1991
JP   08130160 A  *  5/1996

(Continued)

OTHER PUBLICATIONS

Notice of Office Action Japanese Patent Application No. 2013-210971 dated May 12, 2015 with English translation.

*Primary Examiner* — Jeremy C Norris
*Assistant Examiner* — Nathan Milakovich
(74) *Attorney, Agent, or Firm* — McDermott Will & Emery LLP

(57) ABSTRACT

A multilayer ceramic capacitor including, a ceramic body; a plurality of first and second internal electrodes disposed to be alternately exposed through first and second side surfaces facing each other in a width direction; and first and second external electrodes formed on the surfaces of the ceramic body in the length and thickness directions, wherein when a length of the ceramic body is defined as L, a width of the ceramic body is defined as W, a thickness of the ceramic body is defined as h, and a length of the first or second external electrode is defined as B, a ratio L/W of the length to the width of the ceramic body satisfies $1.4 \leq L/W \leq 2.1$, and a relationship B×h/W between the thickness and the width of the ceramic body and the length of the first or second external electrode satisfies $B \times h/W \leq 1.27$.

3 Claims, 3 Drawing Sheets

(56) References Cited

U.S. PATENT DOCUMENTS

| | | | |
|---|---|---|---|
| 8,941,971 B2* | 1/2015 | Park et al. | 361/301.4 |
| 2003/0169556 A1 | 9/2003 | Yokoyama et al. | |
| 2006/0126264 A1 | 6/2006 | Yoshii et al. | |
| 2009/0097187 A1* | 4/2009 | Dattaguru et al. | 361/321.2 |
| 2009/0190285 A1* | 7/2009 | Kusano et al. | 361/321.4 |
| 2012/0050939 A1* | 3/2012 | Si | H01G 4/012 361/303 |
| 2012/0300361 A1 | 11/2012 | Togashi | |
| 2013/0155574 A1* | 6/2013 | Park et al. | 361/321.3 |
| 2013/0229748 A1* | 9/2013 | Chung et al. | 361/301.4 |
| 2014/0166351 A1* | 6/2014 | Lee et al. | 174/258 |
| 2014/0185184 A1* | 7/2014 | Ahn et al. | 361/301.4 |
| 2014/0285950 A1* | 9/2014 | Morita et al. | 361/321.2 |
| 2014/0367152 A1* | 12/2014 | Lee et al. | 174/260 |
| 2014/0368968 A1* | 12/2014 | Lee et al. | 361/301.4 |
| 2015/0008024 A1* | 1/2015 | Park et al. | 174/260 |
| 2015/0008025 A1* | 1/2015 | Park et al. | 174/260 |
| 2015/0060122 A1* | 3/2015 | Lee et al. | 174/260 |

FOREIGN PATENT DOCUMENTS

| | | | |
|---|---|---|---|
| JP | 10-022164 | | 1/1998 |
| JP | 11-186092 A | | 7/1999 |
| JP | 2003-264117 A | | 9/2003 |
| JP | 2006-173270 A | | 6/2006 |
| JP | 2007194312 A | * | 8/2007 |
| JP | 2012-248581 A | | 12/2012 |

* cited by examiner

MULTILAYER CERAMIC CAPACITOR

CROSS-REFERENCE TO RELATED APPLICATIONS

This application claims the benefit of Korean Patent Application No. 10-2013-0081761 filed on Jul. 11, 2013, with the Korean Intellectual Property Office, the disclosure of which is incorporated herein by reference.

BACKGROUND OF THE INVENTION

1. Field of the Invention

The present invention relates to a multilayer ceramic capacitor.

2. Description of the Related Art

A multilayer ceramic capacitor (MLCC), a multilayer chip electronic component, is capable of being used in various electronic devices, due to advantages such as a small size, high capacitance, ease of mounting, or the like.

For example, the multilayer ceramic capacitor is used in a chip-shaped condenser mounted on printed circuit boards of various electronic products including display devices such as liquid crystal displays (LCDs), plasma display panels (PDPs) and the like, as well as including computers, smartphones, mobile phones, and the like, to serve to charge and discharge electricity therein.

In accordance with a miniaturization of SMD, when an MLCC is mounted on a printed circuit board (PCB), or the like, a tombstone phenomenon called a Manhattan phenomenon occurs, and thus, mounting defects are increasingly caused.

Patent Document 1 discloses a multilayer ceramic capacitor allowing the Manhattan phenomenon to be prevented, but does not disclose the limitation of dimensions of a ceramic body and an external electrode.

RELATED ART DOCUMENT

Patent Document (Patent Document 1) Japanese Patent Laid-Open Publication No. 2003-264117

SUMMARY OF THE INVENTION

An aspect of the present invention provides a multilayer ceramic capacitor allowing the occurrence of a tombstone phenomenon to be suppressed during a mounting process to secure high reliability.

According to an aspect of the present invention, there is provided a multilayer ceramic capacitor including: a ceramic body including a plurality of dielectric layers and having first and second main surfaces facing each other in a thickness direction, first and second end surfaces facing each other in a length direction, and first and second side surfaces facing each other in a width direction; a plurality of first and second internal electrodes disposed in the ceramic body to be alternately exposed through the first and second side surfaces, having the dielectric layers therebetween; and first and second external electrodes formed on the surfaces of the ceramic body in the length and thickness directions and electrically connected to the first and second internal electrodes, wherein when a length of the ceramic body is defined as L, a width of the ceramic body is defined as W, a thickness of the ceramic body is defined as h, and a length of the first or second external electrode is defined as B, a ratio L/W of the length to the width of the ceramic body satisfies $1.4 \leq L/W \leq 2.1$, and a relationship B×h/W between the thickness and the width of the ceramic body and the length of the first or second external electrode satisfies $B \times h/W \leq 1.27$.

Each of the first and second external electrodes may have the length smaller than the length of the ceramic body.

The ceramic body may further include upper and lower cover layers respectively formed on upper and lower portions of an active layer having the first and second internal electrodes disposed therein.

The lower cover layer may have a thickness greater than that of the upper cover layer.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
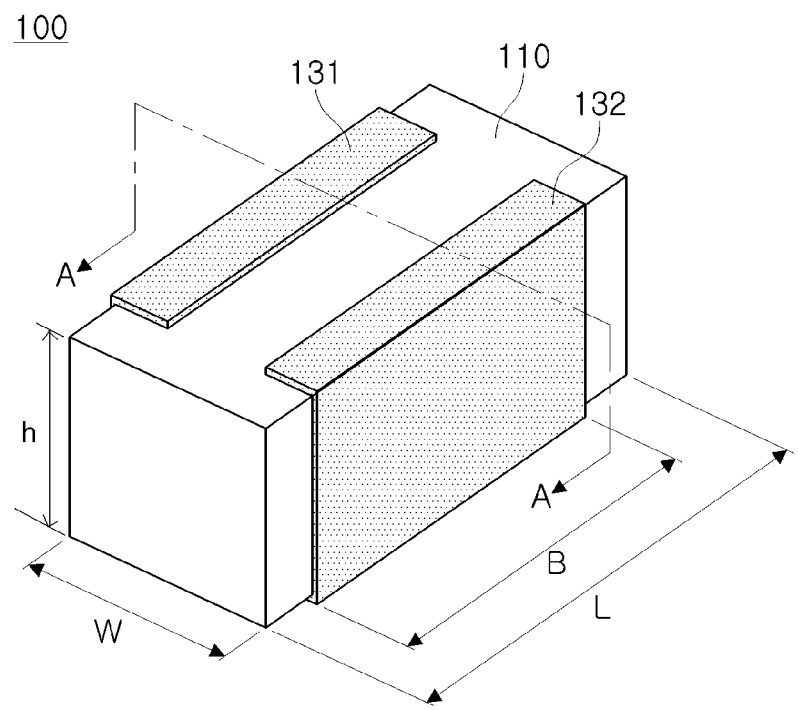
FIG. 1 is a schematic perspective view of a multilayer ceramic capacitor according to an embodiment of the present invention.

Hereinafter, embodiments of the present invention will be described in detail with reference to the accompanying drawings.

The invention may, however, be embodied in many different forms and should not be construed as being limited to the embodiments set forth herein.

Rather, these embodiments are provided so that this disclosure will be thorough and complete, and will fully convey the scope of the invention to those skilled in the art.

In the drawings, the shapes and dimensions of elements may be exaggerated for clarity.

The same reference numerals will be used throughout to designate the same or like elements.

Multilayer Ceramic Capacitor

Figure 2:
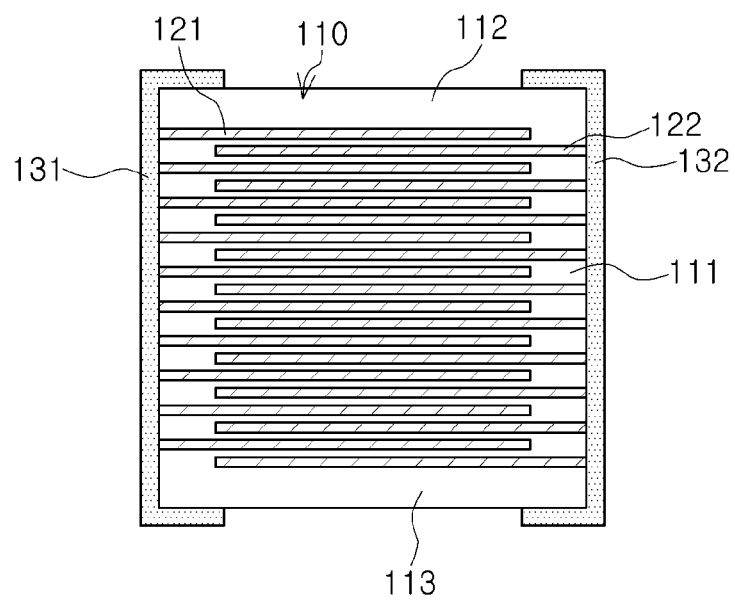
FIG. 2 is a cross-sectional view of the multilayer ceramic capacitor, taken along line A-A' of FIG. 1.

FIG. 1 is a schematic perspective view of a multilayer ceramic capacitor according to an embodiment of the present invention, and FIG. 2 is a cross-sectional view of the multilayer ceramic capacitor, taken along line A-A' of FIG. 1.

Referring to FIGS. 1 and 2, a multilayer ceramic capacitor 100 according to the present embodiment may include a ceramic body 110 including a plurality of dielectric layers 111 stacked in a thickness direction thereof, a plurality of first and second internal electrodes 121 and 122, and first and second external electrodes 131 and 132 electrically connected to the first and second internal electrodes 121 and 122, respectively.

The ceramic body 110 may be formed by stacking and then firing the plurality of dielectric layers 111, wherein boundaries between adjacent dielectric layers 111 may be integrated such that they may not be readily discernible.

The ceramic body 110 may have a hexahedral shape. When directions of a hexahedron are defined in order to clearly describe embodiments of the present invention, L, W, and T shown in the drawings indicate length, width, and thickness directions, respectively.

In the present embodiment, surfaces of the ceramic body 110 facing each other in the thickness direction, that is, a direction in which the dielectric layers 111 of the ceramic body 110 are stacked, may be defined as first and second main surfaces, surfaces connecting the first and second main surfaces and facing each other in the length direction may be defined as first and second end surfaces, and surfaces facing each other in the width direction may be defined as first and second side surfaces.

The dielectric layer 111 may include a ceramic material having a high dielectric constant, and for example, a barium titanate ($BaTiO_3$)-based ceramic powder, or the like, but the present invention is not limited thereto as long as sufficient capacitance is obtained thereby.

Furthermore, the dielectric layers 111 may include a ceramic powder and if necessary, further include various types of ceramic additives such as a transition metal oxide or transition metal carbide, rare earth elements, and magnesium (Mg) or aluminum (Al), an organic solvent, a plasticizer, a binder and a dispersant, along with the ceramic powder.

The first and second internal electrodes 121 and 122, which are electrodes having different polarities, may be stacked on at least one surface of a ceramic sheet forming the dielectric layer 111, and may be disposed in the ceramic body 100 so as to be alternately exposed through the first and second side surfaces, having the dielectric layer 111 therebetween.

In this case, the first and second internal electrodes 121 and 122 may be electrically insulated from each other by the dielectric layers 111 disposed therebetween, and capacitance of the multilayer ceramic capacitor 100 may be proportional to an area of the first and second internal electrodes 121 and 122 overlapped with each other in the stacking direction of the dielectric layers 111.

In addition, the first and second internal electrodes 121 and 122 may be formed of a conductive metal, for example, one of silver (Ag), palladium (Pd), platinum (Pt), nickel (Ni), and copper (Cu), or alloys thereof, and the like, but the present invention is not limited thereto.

The first and second external electrodes 131 and 132 may be formed to cover portions of the first and second internal electrodes 121 and 122 exposed to the first and second side surfaces of the ceramic body 110 to be electrically connected to the first and second internal electrodes 121 and 122, respectively.

The first and second external electrodes 131 and 132 may be extended from the first and second side surfaces to the first and second main surfaces of the ceramic body 110 in a cross-section of the ceramic body 110 in a width-thickness direction.

In addition, the first and second external electrodes 131 and 132 may be formed of a conductive metal, for example, one of silver (Ag), palladium (Pd), platinum (Pt), nickel (Ni), and copper (Cu), or alloys thereof, and the like, but the present invention is not limited thereto.

Further, each of the first and second external electrodes 131 and 132 may have a length B smaller than a length L of the ceramic body 110.

In this case, when the length of the ceramic body 110 is defined as L, a width of the ceramic body 110 is defined as W, a thickness of the ceramic body 110 is defined as h, and the length of the first or second external electrode 131 or 132 is defined as B, a ratio L/W of the length L to the width W of the ceramic body 110 may satisfy $1.4 \leq L/W \leq 2.1$ and a relationship $B \times h/W$ between the thickness and the width of the ceramic body 110 and the length of the first or second external electrode 131 or 132 may satisfy $B \times h/W \leq 1.27$.

Meanwhile, first and second plating layers (not shown) may be further formed on surfaces of the first and second external electrodes 131 and 132, as needed.

The first and second plating layers may include a nickel (Ni) plating layer formed on the first and second external electrodes 131 and 132 and a tin (Sn) plating layer formed on the nickel plating layer.

The first and second plating layers are provided to increase adhesion strength between the multilayer ceramic capacitor 100 and a printed circuit board at the time of mounting the multilayer ceramic capacitor 100 on the printed circuit board, or the like, by solder, or the like. The plating may be performed by a method known in the art, and lead-free plating may be preferred in consideration of eco-friendly factors, but the present invention is not limited thereto.

Hereinafter, a method of manufacturing the multilayer ceramic capacitor according to the embodiment of the present invention will be described.

First, a plurality of ceramic sheets are prepared. The ceramic sheets are provided to form the dielectric layers 111 of the ceramic body 110 and may be manufactured by mixing a ceramic powder, a polymer, a solvent, and the like to prepare a slurry, and then applying and drying the slurry onto carrier films to form the slurry in sheet shapes each having a thickness of several μm by a doctor blade method or the like.

Next, the first and second internal electrodes 121 and 122 are formed by printing a conductive paste at a predetermined thickness on at least one surface of each ceramic sheet.

Here, the first and second internal electrodes 121 and 122 are exposed through both side surfaces of the ceramic sheet in the width direction, respectively.

The conductive paste may be formed of one of silver (Ag), palladium (Pd), platinum (Pt), nickel (Ni), and copper (Cu), or alloys thereof, and the like, but the present invention is not limited thereto.

Methods of printing the conductive paste may include a screen printing method, a gravure printing method, and the like, but the present invention is not limited thereto.

Next, a stacked body may be prepared by stacking and pressing the plurality of ceramic sheets in the thickness direction, the plurality of ceramic sheets having the first and second internal electrodes 121 and 122 formed therein to face each other, with the ceramic sheets interposed therebetween.

Then, the stacked body is cut into portions, each corresponding to one capacitor chip, and then the portions are fired at a high temperature to prepare the ceramic bodies 110 each having first and second main surfaces facing each other in a thickness direction, first and second end surfaces facing each other in a length direction, and first and second side surfaces facing each other in a width direction and having the first and second internal electrodes 121 and 122 alternately exposed thereto.

Next, the first and second external electrodes 131 and 132 are formed on the surfaces of the ceramic body 110 in the width and thickness directions by printing the conductive paste at a predetermined thickness or dipping the ceramic body into the conductive paste to thereby be electrically connected to the exposed portions of the first and second internal electrodes 121 and 122.

The first and second external electrodes 131 and 132 may be extended from the first and second side surfaces to the first and second main surfaces.

The conductive paste may be formed of one of silver (Ag), palladium (Pd), platinum (Pt), nickel (Ni), and copper (Cu), or alloys thereof, and the like, but the present invention is not limited thereto.

As necessary, the length B of the first or second external electrode 131 or 132 may be smaller than the length L of the ceramic body 110. Thus, electrodes are not formed on the both end surfaces of the multilayer ceramic capacitor 100 and thus, a pitch between chips may be reduced during a mounting process to allow for a high density mounting.

In this case, when the length of the ceramic body 110 is defined as L, the width of the ceramic body 110 is defined as W, the thickness of the ceramic body 110 is defined as h, and the length of the first or second external electrode 131 or 132 is defined as B, the ratio L/W of the length L to the width W of the ceramic body 110 may satisfy 1.4≤L/W≤2.1 and the relationship B×h/W between the thickness and the width of the ceramic body 110 and the length of the first or second external electrode 131 or 132 may satisfy B×h/W≤1.27.

Meanwhile, after forming the first and second external electrodes 131 and 132, a plating process such as an electroplating process may be performed on the surfaces of the first and second external electrodes 131 and 132 to form the first and second plating layers.

Examples of materials used in the plating process may include nickel or tin, a nickel-tin-alloy, and the like, but the present invention is not limited thereto.

In addition, the first and second plating layers may have a two-layer structure by sequentially stacking a nickel plating layer and a tin plating layer on the surfaces of the first and second external electrodes 131 and 132, as needed.

Figure 4:
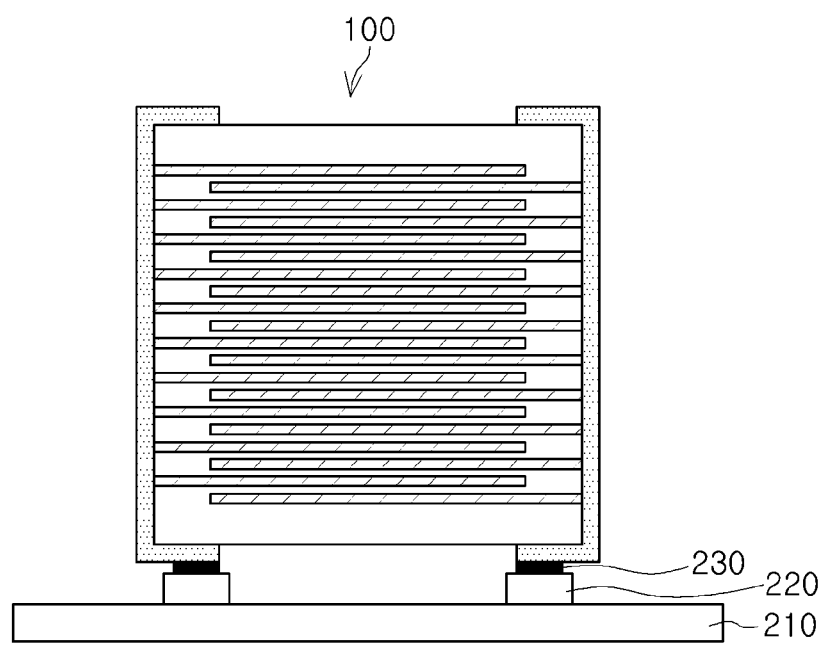
FIG. 4 is a schematic side cross-sectional view illustrating a state in which the multilayer ceramic capacitor according to the embodiment of the present invention is mounted on a board.

FIG. 4 is a schematic side cross-sectional view illustrating a state in which the multilayer ceramic capacitor according to the embodiment of the present invention is mounted on a board.

Referring to FIG. 4, a mounting board of the multilayer ceramic capacitor 100 according to the present embodiment may include a printed circuit board 210 having the multilayer ceramic capacitor 100 mounted thereon, and first and second electrode pads 220 formed on the printed circuit board 210 to be spaced apart from each other.

In this case, the multilayer ceramic capacitor 100 may be electrically connected to the printed circuit board 210 by a solder 230 while the first and second external electrodes 131 and 132 are positioned on the first and second electrode pads 220 to contact therewith, respectively.

Figure 3:
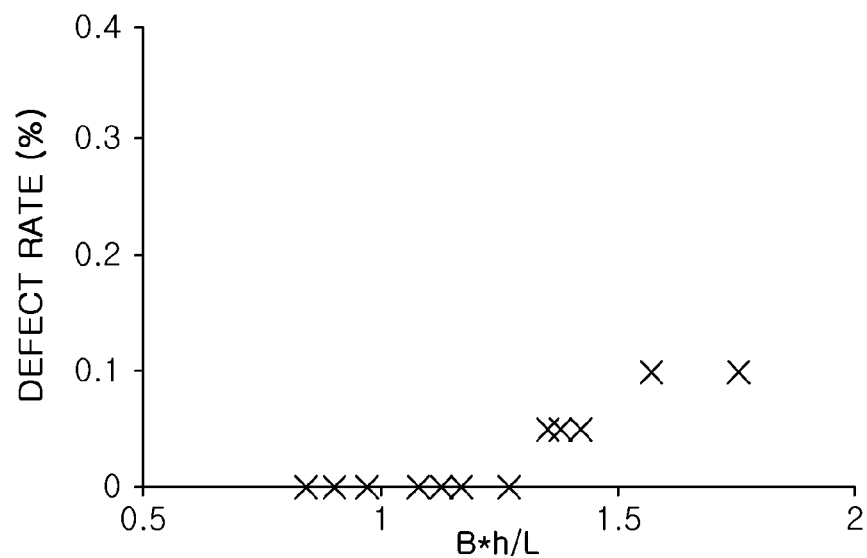
FIG. 3 is a graph showing a mounting defect rate according to dimensions of a ceramic body and external electrodes in the multilayer ceramic capacitor according to the embodiment of the present invention.

Table 1 below shows a mounting defect rate according to dimensions of the ceramic body 110 and the first and second external electrodes 131 and 132 in the multilayer ceramic capacitor according to the embodiment of the present invention. FIG. 3 is a graph showing a mounting defect rate according to dimensions of the ceramic body 110 and the first and second external electrodes 131 and 132 in the multilayer ceramic capacitor according to the embodiment of the present invention.

TABLE 1

| W (mm) | h (mm) | B (mm) | B * h/W | Error Rate (%) |
| --- | --- | --- | --- | --- |
| 0.52 | 0.78 | 0.60 | 0.90 | 0.00 |
| 0.52 | 0.78 | 0.75 | 1.13 | 0.00 |
| 0.52 | 0.78 | 0.90 | 1.35 | 0.05 |
| 0.57 | 0.85 | 0.65 | 0.97 | 0.00 |
| 0.57 | 0.85 | 0.85 | 1.27 | 0.00 |
| 0.57 | 0.85 | 1.05 | 1.57 | 0.10 |
| 0.57 | 0.95 | 0.70 | 1.17 | 0.00 |
| 0.57 | 0.95 | 0.85 | 1.42 | 0.05 |
| 0.57 | 0.95 | 1.05 | 1.75 | 0.10 |
| 0.96 | 1.15 | 0.70 | 0.84 | 0.00 |
| 0.96 | 1.15 | 0.90 | 1.08 | 0.00 |
| 0.96 | 1.15 | 1.15 | 1.38 | 0.05 |

Referring to FIG. 3 and Table 1 above, in the present embodiment, when the length of the ceramic body 110 is defined as L, the width of the ceramic body 110 is defined as W, the thickness of the ceramic body 110 is defined as h, and the length of the first or second external electrode 131 or 132 is defined as B, the ratio L/W of the length L to the width W of the ceramic body 110 may satisfy 1.4≤L/W≤2.1 and the relationship B×h/W between the thickness and the width of the ceramic body 110 and the length of the first or second external electrode 131 or 132 may satisfy B×h/W≤1.27. Accordingly, the occurrence of a tombstone phenomenon is prevented during a mounting process to prevent mounting defects, thereby result in an increase in product reliability. This effect may allow for an improvement in a manufacture yield of a mounting process to increase product reliability.

In addition, since the width of the ceramic body 110 is smaller than the length thereof, equivalent series inductance (ESL) of the multilayer ceramic capacitor 100 may be further reduced and high frequency properties of a product may be improved.

In addition, since the length of the ceramic body 110 is greater than the thickness thereof, the multilayer ceramic capacitor 100 may be designed to have a higher degree of capacitance, thereby reducing the number and costs of circuit components.

Modified Example

Figure 5:
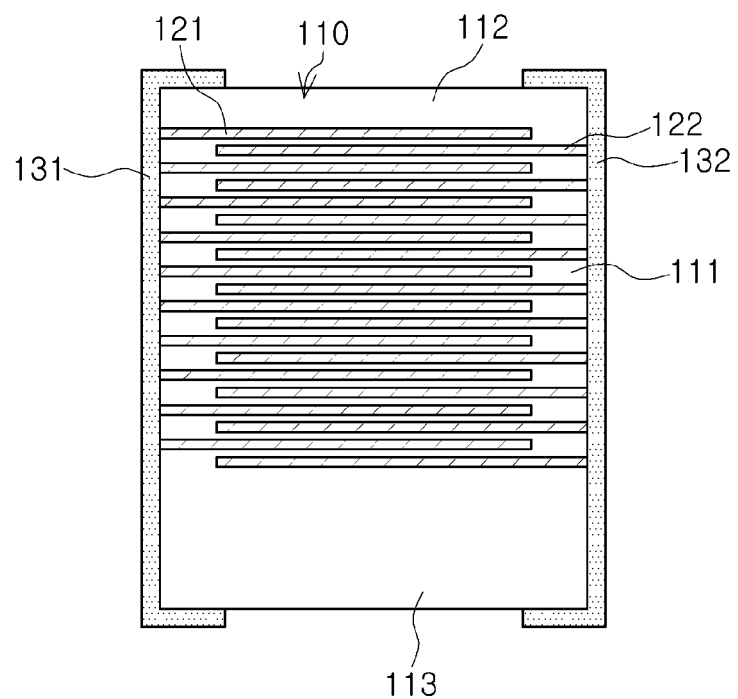
FIG. 5 is a schematic side cross-sectional view of a multilayer ceramic capacitor according to another embodiment of the present invention.

FIG. 5 is a schematic side cross-sectional view of a multilayer ceramic capacitor according to another embodiment of the present invention.

Here, since a structure in which the first and second internal electrodes 121 and 122 and the first and second external electrodes 131 and 132 are formed is similar to the structure as previously described in the embodiment of the present invention, a specific description thereof will be omitted in order to avoid repeated explanations.

In this case, in the cross-section of the multilayer ceramic capacitor 100 in the width-thickness direction, a portion in which the internal electrodes are disposed to form capacitance may be defined as an active layer, and portions except for the active layer may be defined as margin parts.

Among the margin parts, upper and lower margin parts of the active layer in the thickness direction may be defined as an upper cover layer 112 and a lower cover layer 113, respectively.

The upper cover layer 112 and lower cover layer 113 may be formed by sintering ceramic sheets in a similar manner to that of the dielectric layer 111 formed between the first and second internal electrodes 121 and 122.

In addition, the plurality of dielectric layers including the upper cover layer 112 and lower cover layer 113 may be in a sintered state, and adjacent dielectric layers may be integrated such that boundaries thereof therebetween may not be discerned without using a scanning electron microscope (SEM).

Referring to FIG. 5, the lower cover layer 113 may have a thickness greater than that of the upper cover layer 112 in the present embodiment.

That is, the lower cover layer 113 may have the thickness greater than that of the upper cover layer 112 by increasing the number of the ceramic sheets stacked in the lower cover layer 113 as compared to the upper cover layer 112.

The lower cover layer 113 has the thickness greater than that of the upper cover layer 112 as described above, such that acoustic noise may be effectively decreased.

According to the present embodiment, the first and second external electrodes may be configured of pairs of terminals spaced apart from each other. However, embodiments of the present invention are not limited thereto. As necessary, the number of each of the first and second external electrodes spaced apart from each other may be three or more.

As set forth above, according to the embodiments of the present invention, dimensions of a ceramic body and an external electrode may be limited to suppress the occurrence of a tombstone phenomenon during a mounting process, thereby reducing a mounting defect rate.

This effect may allow for an improvement in a manufacture yield of a mounting process to increase product reliability.

While the present invention has been shown and described in connection with the embodiments, it will be apparent to those skilled in the art that modifications and variations can be made without departing from the spirit and scope of the invention as defined by the appended claims.

What is claimed is:

1. A multilayer ceramic capacitor comprising:
   a ceramic body including a plurality of dielectric layers and having first and second main surfaces facing each other in a thickness direction, first and second end surfaces facing each other in a length direction, and first and second side surfaces facing each other in a width direction;
   a plurality of first and second internal electrodes disposed in the ceramic body to be alternately exposed through the first and second side surfaces, having the dielectric layers therebetween; and
   first and second external electrodes formed on the surfaces of the ceramic body in the length and thickness directions and electrically connected to the first and second internal electrodes,
   wherein when a length of the ceramic body is defined as L, a width of the ceramic body is defined as W, a thickness of the ceramic body is defined as h, and a length of the first or second external electrode is defined as B, a ratio L/W of the length to the width of the ceramic body satisfies $1.4 \leq L/W \leq 2.1$, and a relationship $B \times h/W$ between the thickness and the width of the ceramic body and the length of the first or second external electrode satisfies $0.90 \leq B \times h/W \leq 1.27$, and
   wherein each of the first and second external electrodes has the length smaller than the length of the ceramic body.

2. The multilayer ceramic capacitor of claim 1, wherein the ceramic body further includes upper and lower cover layers respectively formed on upper and lower portions of an active layer having the first and second internal electrodes disposed therein.

3. The multilayer ceramic capacitor of claim 2, wherein the lower cover layer has a thickness greater than that of the upper cover layer.

* * * * *